United States Patent [19]

Hamby, Jr.

[11] Patent Number: 4,899,794

[45] Date of Patent: Feb. 13, 1990

[54] TREE DELIMBING DEVICE WITH SELF-ALIGNING CUTTER HEAD

[76] Inventor: Thomas E. Hamby, Jr., Rte. 1, Box 27A, Purlear, N.C. 28665

[21] Appl. No.: 370,030

[22] Filed: Jun. 22, 1989

[51] Int. Cl.⁴ .......................... A01G 23/00; B27L 1/00
[52] U.S. Cl. ..................................... 144/2 Z; 144/343
[58] Field of Search ................. 144/2 Z, 3 D, 208 R, 144/343

[56] References Cited

U.S. PATENT DOCUMENTS

| | | | |
|---|---|---|---|
| 3,572,410 | 3/1971 | McElderry | 144/2 Z |
| 4,034,785 | 7/1977 | Tucek | 144/2 Z |
| 4,049,032 | 9/1977 | Oldenburg et al. | 144/2 Z |
| 4,124,047 | 11/1978 | Dressler et al. | 144/2 Z |
| 4,742,854 | 5/1988 | Forslund | 144/242 D |
| 4,749,012 | 6/1988 | Hamby, Jr. | 144/2 Z |
| 4,766,939 | 8/1988 | Forslund | 144/2 Z |
| 4,815,506 | 3/1989 | Kainz | 144/2 Z |

Primary Examiner—W. Donald Bray
Attorney, Agent, or Firm—Bell, Seltzer, Park & Gibson

[57] ABSTRACT

Improved pivotal support means is provided for supporting the rectangular support frame of the self-aligning cutter head assembly for pivotal movement in both the vertical and horizontal planes. The improved pivotal support insures that the limb stripping blades and the guide means carried by the rectangular support frame are maintained in parallel alignment with the longitudinal axis of the tree trunk as the tree trunk is being pulled through the tree delimbing device. The rectangular support frame is supported for pivotal movement in the vertical plane and in a cradled relationship on the upper ends of the vertical legs of a support yoke extending beneath the rectangular support frame. The rectangular support frame is supported for movement in the horizontal plane by a pivot extending through the horizontal medial portion of the yoke member and beneath the rectangular support frame.

6 Claims, 2 Drawing Sheets

TREE DELIMBING DEVICE WITH SELF-ALIGNING CUTTER HEAD

FIELD OF THE INVENTION

This invention relates generally to a tree delimbing device with a self-aligning cutter head assembly, and more particularly to a tree delimbing device provided with curved cutting and limb stripping blades carried by a rectangular support frame supported for pivotal movement in both the vertical and horizontal planes so that the limb stripping blades are automatically maintained parallel with the longitudinal axis of the tree as the tree is pulled through the cutter head assembly by the grapple of a knuckle boom loader.

BACKGROUND OF THE INVENTION

My prior U.S. Pat. No. 4,749,012 discloses a self-aligning cutter head assembly for delimbing trees in which curved cutting and limb stripping blades are carried by a rectangular support frame supported for pivotal movement in both vertical and horizontal planes so that the limb stripping blades are automatically maintained parallel with the longitudinal axis of the tree as the tree is pulled through the cutter head assembly by the grapple of a knuckle boom loader. In the device of my prior patent, the pivotal support in both the vertical and horizontal planes for the rectangular support frame is provided by a "fifth-wheel" connection in which both the pivot pins for providing vertical and horizontal movement are spaced close together and are both positioned beneath the rectangular support frame. While the pivotal support for the rectangular support frame in both the vertical and horizontal planes of my prior patent operates satisfactorily to maintain the limb stripping blades parallel with the longitudinal axis of the tree as it is being pulled through the cutter head assembly by the grapple of a knuckle boom loader, the close proximity of the vertical and horizontal pivot pins provided in the "fifth-wheel" connection can cause problems in certain instances. For example, if the weight of the rectangular support frame is not evenly distributed above the fifth-wheel pivotal connection, the rectangular support frame and the curved limb stripping blades carried thereby may tend to swing to a position where one portion is lower so that the cutter head is not properly aligned to receive the tree trunk at the beginning of a delimbing operation.

SUMMARY OF THE INVENTION

With the foregoing in mind, it is an object of the present invention to provide a tree delimbing device with a self-aligning cutter head assembly in which the support frame for the curved limb stripping blades is supported for movement in the vertical plane by pivot supports positioned on opposite sides of the frame and in the horizontal plane by a pivotal connection beneath the support frame. The separation of the pivotal connections for providing pivotal movement in both the vertical and horizontal planes enhances the ability of the delimbing device to maintain the limb stripping blades parallel with the longitudinal axis of the tree as the tree is pulled through the cutter head assembly by the grapple of a knuckle boom loader.

The pivotal supports positioned on opposite sides of the rectangular support frame for supporting the same for pivotal movement in the vertical plane is preferably located along the longitudinal axis of the tree trunk as the tree is being pulled through the cutter head assembly. A support yoke is provided with a horizontal medial portion extending beneath the support frame and with upstanding vertical legs having their upper ends connected to the pivotal connections on opposite sides of the rectangular support frame. Thus, the rectangular support frame is supported in the support yoke in a "cradled" arrangement, thereby enhancing the self-aligning feature of the cutter head assembly when vertical variations are imparted to the tree trunk as it is pulled through the cutter head assembly. The medial portion of the support yoke is pivotally connected to a base frame by a slew or swivel ring connector located in longitudinal alignment beneath the longitudinal axis of the tree trunk and at a forward position beneath the position of the limb stripping blades so that any variation in the horizontal path of movement of the tree trunk is immediately transferred to the rectangular support frame to maintain the limb stripping blades in alignment with the longitudinal axis of the tree trunk as it is pulled through the delimbing device.

BRIEF DESCRIPTION OF THE DRAWINGS

Other objects and advantages will appear as the description proceeds when taken in connection with the accompanying drawings, in which—

DESCRIPTION OF THE ILLUSTRATED EMBODIMENT

Figure 1:
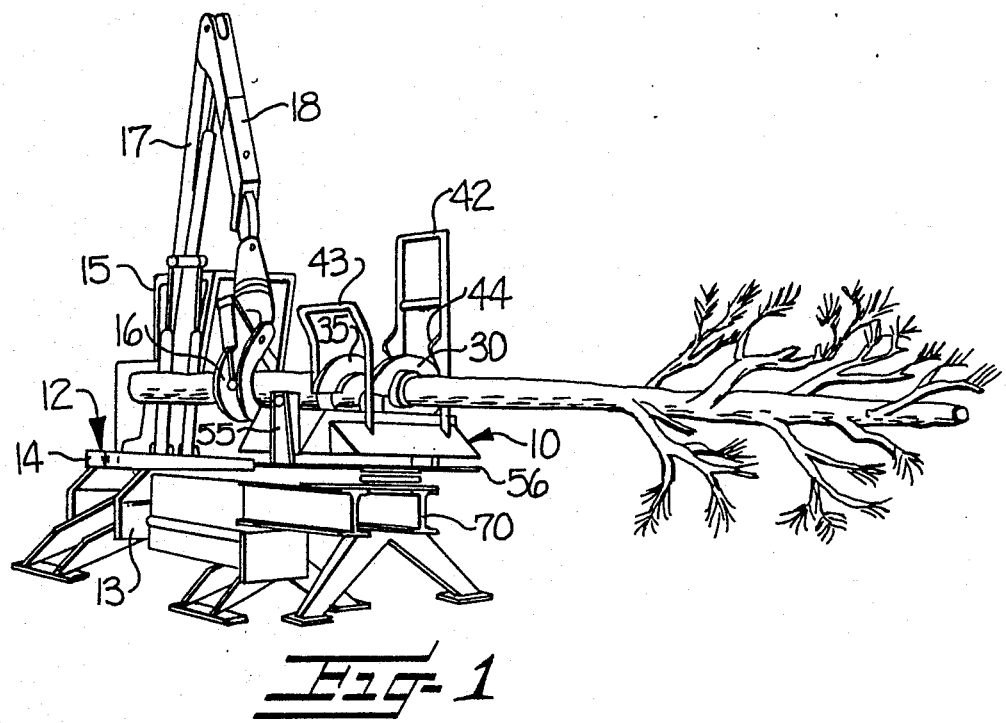
FIG. 1 is a perspective view of the tree delimbing device supported on one end of a knuckle boom loader and illustrating a tree trunk being pulled through the cutter head assembly by the grapple of the knuckle boom loader.

The self-aligning cutter head assembly, broadly indicated at 10, of the present tree delimbing device is supported on an extension of one end of a knuckle boom loader, broadly indicated at 12. The knuckle boom loader 12 may be of any suitable type and includes a lower frame 13 supporting a pivotal platform 14 on which is mounted a suitable operator enclosure 15 and a boom, including crane arms 17, 18, supporting a grapple 16 on the outer end thereof. The crane arms 17, 18 are operated in the usual manner by means of the usual hydraulic cylinders.

The knuckle boom loader 12 is normally employed to lift felled and delimbed trees to either cut them in predetermined lengths and place them on a truck for transportation, or to lift full length trees and place them on a truck for transportation. The trees are normally skidded or dragged from the forest to a point adjacent the knuckle boom loader 12, after having had the limbs cut therefrom in the woods by a hand chain saw operation, and are piled in a convenient location adjacent the knuckle boom loader 12. By providing the self-aligning cutter head assembly 10 on the knuckle boom loader 12, the operator can carry out the delimbing operation in an efficient and economical manner by simply drawing the tree through the cutter head assembly after the tree is lifted from the stack of trees to be loaded. The delimbed tree may then be positioned on the length cutter, not shown, and then the cut length is loaded on the truck, or the whole delimbed tree can be directly loaded on a truck positioned adjacent the knuckle boom loader 12.

The self-aligning cutter head assembly 10 is of the same type as disclosed in my prior U.S. Pat. No. 4,749,01 and includes a rectangular support frame with respective front and rear walls 20, 21, opposite inwardly inclined side walls 22, 23, and an upper cover plate 24. The front wall 20 is provided with a downwardly slanting limb deflecting shield 27. Curved cutting and limb stripping levers 30, 30' are pivotally supported adjacent their lower ends for movement toward and away from each other and adjacent the front end 20 of the rectangular support frame. The curved cutting and limb stripping levers 30, 30' have respective curved blades 31, 31' fixed to their inner curved surfaces and collectively define a tree encircling cutting opening therebetween for longitudinal movement of the tree trunk in one direction through the cutting opening, as illustrated in FIG. 1.

Guide means, in the form of curved tree trunk guide levers 35, 35' are pivotally supported adjacent their lower ends for movement toward and away from each other and adjacent the rear end 21 of the rectangular support frame. The inner curved surfaces of the guide levers 35, 35' are provided with respective curved guide plates 36, 36' and collectively define a tree encircling guide opening therebetween for axial movement of the tree trunk through the guide opening, as illustrated in FIG. 1.

Figure 3:
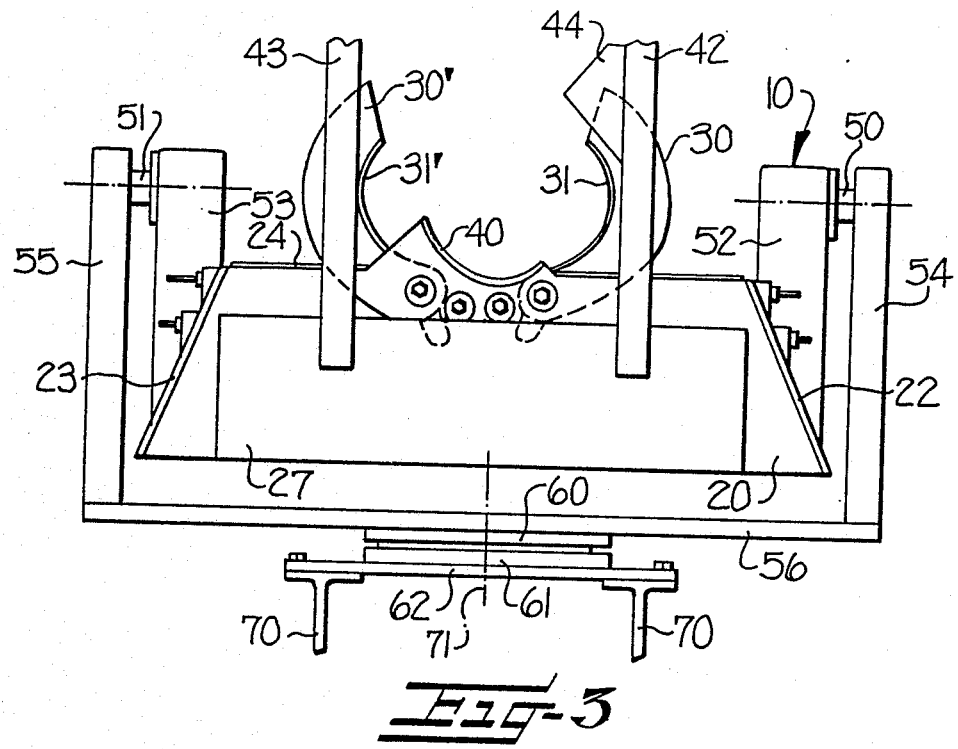
FIG. 3 is a front elevational view of the delimbing device, looking at the right-hand end of FIG. 2.

The lower end portions of the curved limb stripping levers 30, 30' and the lower end portions of the guide levers 35, 35' are fixed on respective tubular sleeve members, not shown, supported for rotation in the rectangular support frame. Tension springs, not shown, normally urge the stripping levers 30, 30' and the guide levers 35, 35' inwardly toward each other in surrounding and encircling relationship with the tree trunk, as illustrated in FIG. 1. Hydraulic cylinders, not shown, are also provided in the rectangular support frame for moving the limb stripping levers 30, 30' and the guide levers 35, 35' outwardly away from each other to the open position shown in FIGS. 3 and 4 so that a tree trunk may be placed in position for stripping the limbs therefrom. Various types of mechanisms may be employed for moving the limb stripping levers 30, 30' and the guide levers 35, 35' between the open and closed positions and the operating mechanisms may be controlled by the operator of the knuckle boom loader by a suitable control positioned in the operator enclosure 15.

A curved fixed cutting and limb stripping blade 40 is fixed on and extends upwardly above the front wall 20. The fixed blade 40 cooperates with the curved blades 31, 31' to encircle the tree trunk and complete the cutting opening through which the tree trunk passes when the stripping levers 30, 30' are moved inwardly to the closed position shown in FIG. 1. Substantially inverted U-shaped guide bars 42, 43 have their lower ends fixed on the rectangular support frame and extend upwardly beside and adjacent the respective cutting and limb stripping levers 30, 30' and the guide levers 35, 35'. These guide bars 42, 43 are used to aid in guiding the tree trunk into the proper position for limb stripping. The inner surfaces of the medial portions of the vertical legs of the guide bar 42 are provided with inwardly extending cam plates 44 for further aiding in guiding the tree trunk into the proper position for encircling engagement by the curved cutting and stripping levers 30, 30' and the guide levers 35, 35'.

In accordance with the present invention, improved means is provided for supporting the rectangular support frame for pivotal movement in both the vertical and horizontal planes so that the rectangular support frame, along with the limb stripping blades 31, 31' and the guide levers 35, 35', are maintained in alignment with the longitudinal axis of the tree trunk as the tree trunk is drawn through the respective cutting and guiding means at the respective front and rear ends of the rectangular support frame by the grapple 16 of the knuckle boom loader 12. The improved pivot support means for the rectangular support frame includes horizontally extending pivot pins 50, 51 (FIG. 3) fixed at their inner ends on the upper ends of vertical mounting brackets 52, 53, the lower ends of which are fixed on opposite sides 22, 23 of the rectangular support frame. The outer ends of the pivot pins 50, 51 are supported in the upper ends of upstanding vertical legs 54, 55 of a support yoke, including a horizontal medial portion, in the form of a plate 56, extending beneath the rectangular support frame. The horizontal plate 56, forming the medial portion of the support yoke, has forwardly and rearwardly curved edges, as indicated in dotted lines in FIG. 4. Thus, the rectangular support frame is cradled for swinging or pivotal movement in the vertical plane between the opposite vertical legs 54, 55 of the support yoke. It is preferred that the pivot pins 50, 51 be located at a position between the front and rear ends of the rectangular support frame which is slightly rearwardly of the center of gravity so that the forward end of the rectangular support frame is tilted downwardly by a slight amount, as illustrated in FIG. 2, when the cutter head assembly is not in use.

Figure 2:
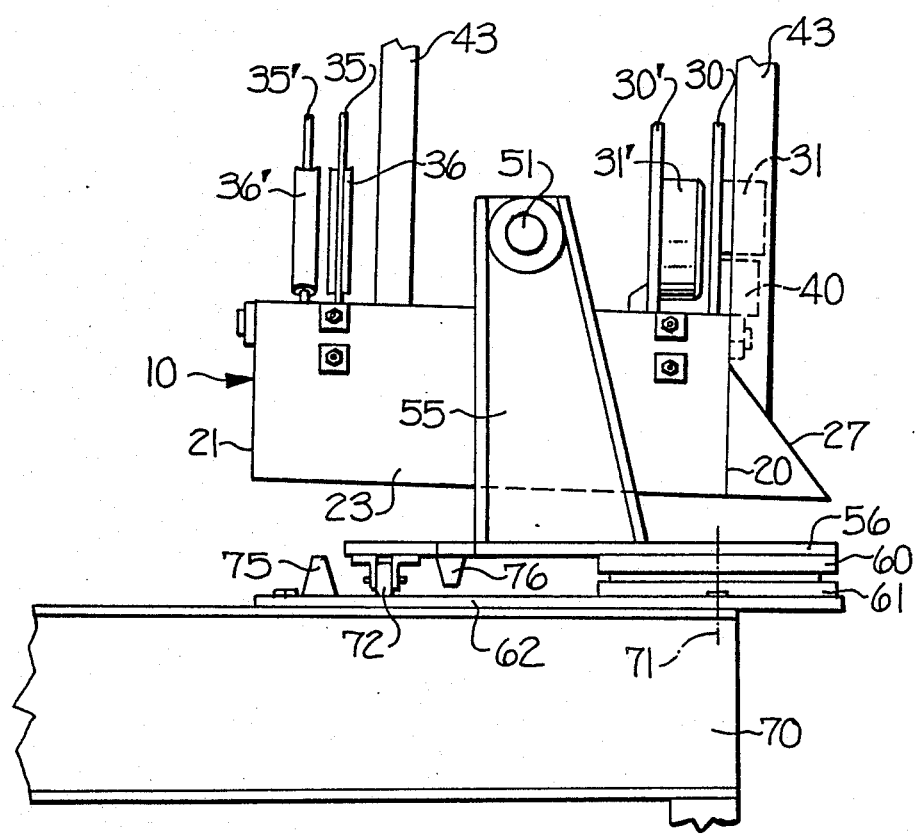
FIG. 2 is a fragmentary side elevational view of the rectangular support frame, illustrating the manner in which the same is pivotally supported on the front end portion of the frame of the knuckle boom loader.

As best illustrated in FIG. 2, the horizontal plate 56 of the support yoke extends beneath the rectangular support frame and has the upper plate 60 of a slew or swivel ring attached thereto. The upper plate 60 is supported in the usual manner by ball bearings on a lower plate 61 of the slew or swivel ring. The lower plate 61 is fixed on a base support plate 62 which is in turn fixed on the upper surface of the forward ends of spaced-apart support channels 70 which extend the support frame 13 of the knuckle boom loader 12. Thus, the plates 60, 61 of the slew or swivel ring provide a pivotal connection for movement of the rectangular support frame in a horizontal plane. As illustrated in FIG. 2, the rotational axis of the slew or swivel ring, as indicated by the dash-dot line 71 in FIG. 2, is preferably positioned beneath or slightly forwardly of the limb stripping blades 31, 31'. Since the horizontal pivotal axis 71 is forwardly of the pivot pins 50, 51, considerable weight is placed on the rear portion of plate 56 forming the horizontal medial portion of the support yoke. To prevent this weight from causing damage to the slew or swivel ring, one or more support rollers 72 may be suitably attached to the lower surface of the plate 56 and ride along the upper surface of the support plate 62, as the rectangular support frame is pivoted in the horizontal plane.

Figure 4:
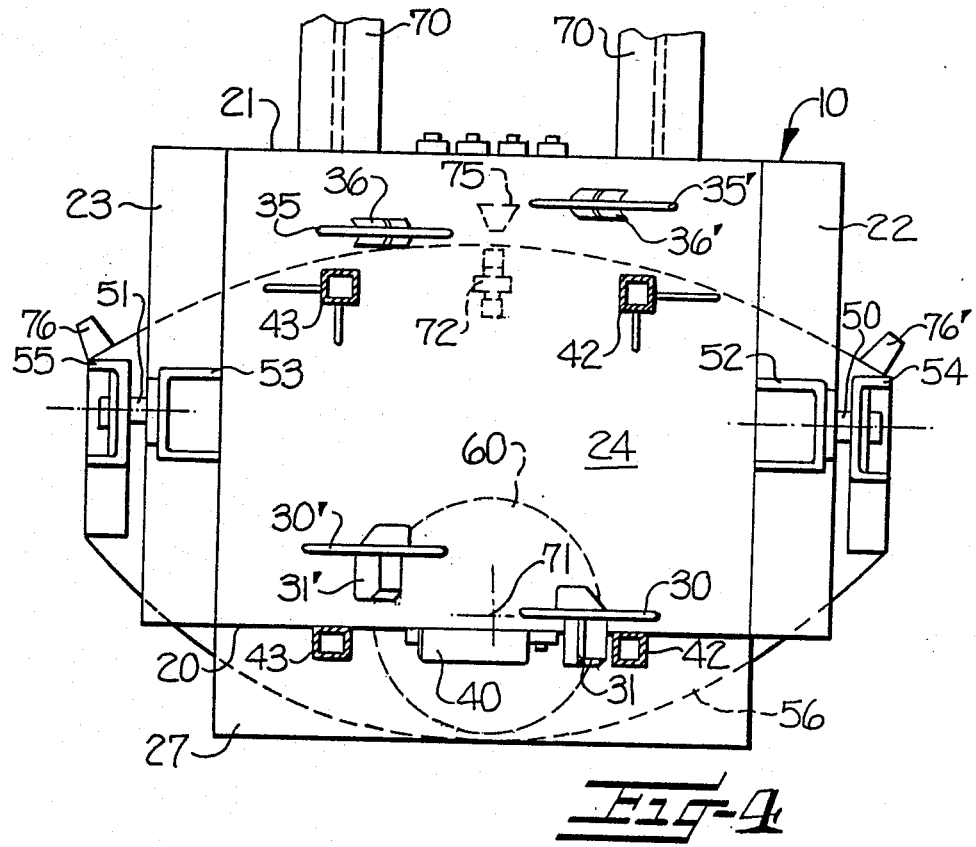
FIG. 4 is a plan view of the delimbing device of FIGS. 2 and 3.

Suitable stop means is provided for limiting pivoting movement of the cutter head assembly 10 in the horizontal plane. As illustrated in FIGS. 2 and 4, this stop means includes a center stop 75 extending upwardly from the base support plate 62, and a pair of stop members 76, 76' extending downwardly from the plate 56. With pivoting movement of the plate 56 in the horizontal plane, the respective stop members 76, 76' engage the center stop 75 and prevent further pivoting movement of the plate 56 and the cutter head assembly 10 carried thereby.

The improved rectangular support frame pivot support of the present invention insures that the curved cutting and limb stripping blades and the curved guide levers are automatically maintained in alignment with the longitudinal axis of the tree trunk as it is pulled through the cutter head assembly by the knuckle boom loader operator so that the tree limbs are quickly and efficiently removed from the tree trunk. This self-aligning feature of the cutter head assembly permits use of the tree delimbing device by a knuckle boom loader with very little experience since it is not necessary that the operator pull the tree trunk through the tree delimbing device along a particular path of travel.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A tree delimbing device with a self-aligning cutter head assembly comprising
   a rectangular support frame including front and rear ends, and opposite sides,
   curved cutting and limb stripping levers pivotally supported for movement toward and away from each other and adjacent said front end of said rectangular support frame, said stripping levers including curved blades fixed thereto and defining a tree encircling cutting opening therebetween for longitudinal movement of a tree in one direction through the cutting opening,
   guide means supported adjacent said rear end of said rectangular support frame and defining a tree guide opening for axial movement of the tree trunk through the guide opening,
   means supporting said rectangular support frame for pivotal movement in both the vertical and horizontal planes so that said rectangular support frame, said limb stripping blades and said guide means are maintained in alignment with the longitudinal axis of the tree trunk as the tree trunk moves through the respective cutting and guiding means at the respective front and rear ends of said rectangular support frame,
   wherein said means for supporting said rectangular support frame in the vertical plane includes pivot means supported on opposite sides of said rectangular support frame, and a support yoke including a horizontal medial portion extending beneath said rectangular support frame, and upstanding vertical legs having upper ends connected to said pivot means on opposite sides of said rectangular support frame, and
   wherein said means for supporting said rectangular support frame in the horizontal plane includes a base plate supported beneath said horizontal medial portion of said yoke member, and pivotal means connecting said horizontal medial portion of said yoke member to said base plate.

2. A tree delimbing device according to claim 1 wherein said pivotal means connecting said horizontal medial portion of said yoke member to said base plate comprises a swivel plate including upper and lower plate members rotatable relative to each other about a vertical pivotal axis.

3. A tree delimbing device according to claim 1 wherein said pivot means supported on said opposite sides of said rectangular support frame includes support pins positioned in substantial alignment with the longitudinal axis of the tree trunk being moved through the respective cutting and guiding means.

4. A tree delimbing device according to claim 3 wherein said support pins are positioned slightly rearwardly of the center of gravity so that the forward end of said rectangular support frame is tilted downwardly by a slight amount when said cutter head assembly is not in use.

5. A tree delimbing device according to claim 4 wherein said pivot means connecting said horizontal medial portion of said yoke member to said base plate is positioned forwardly of said support pins on opposite sides of said rectangular support frame.

6. A tree delimbing device according to claim 5 wherein said pivot means connecting said horizontal medial portion of said yoke member to said base plate is positioned in substantial alignment beneath said curved cutting and limb stripping levers.

* * * * *